United States Patent
Wöll

[19]

[11] Patent Number: 6,129,974

[45] Date of Patent: Oct. 10, 2000

[54] BULLETPROOF GLASS WINDOW WITH METAL INSERT

[75] Inventor: Herwig Wöll, Sachsenheim, Germany

[73] Assignee: ISOCLIMA GmbH, Munich, Germany

[21] Appl. No.: 09/169,969

[22] Filed: Oct. 13, 1998

[30] Foreign Application Priority Data

Oct. 13, 1997 [DE] Germany .......................... 197 45 248

[51] Int. Cl.⁷ .............................. B32B 23/02; F41H 5/00
[52] U.S. Cl. .......................... 428/192; 428/415; 428/416; 428/417; 89/36.01
[58] Field of Search .................................. 428/192, 415, 428/417, 418, 426, 436, 437, 416; 52/509, 546; 296/84.1; 2/2.5; 89/36.01

[56] References Cited

U.S. PATENT DOCUMENTS

| | | | |
|---|---|---|---|
| 3,061,490 | 10/1962 | Ryan ........................................... | 428/81 |
| 3,311,517 | 3/1967 | Keslar et al. ............................... | 428/81 |
| 4,799,346 | 1/1989 | Bolton ......................................... | 428/441 |
| 5,885,714 | 3/1999 | Demeester ................................. | 428/192 |

FOREIGN PATENT DOCUMENTS

| | | |
|---|---|---|
| 33 20 157 | 11/1987 | Germany . |
| 40 23 801 | 1/1991 | Germany . |
| 40 06 711 | 9/1991 | Germany . |
| 40 23 005 | 1/1992 | Germany . |
| 41 42 416 | 6/1993 | Germany . |
| 42 36 233 | 4/1996 | Germany . |
| 196 01 982 | 12/1996 | Germany . |

OTHER PUBLICATIONS

"Die verklebte Verglasung in der Automobilindustrie", by Dr. Dietrich Schlotterbeck, SPRECHSAAL., vol. 117, No. 9, 1984.

*Primary Examiner*—Donald Loney
*Attorney, Agent, or Firm*—Lowe Hauptman Gopstein Gilman & Berner

[57] ABSTRACT

A bulletproof glass window, for preferred use in a motor vehicle, includes at least one glass pane (10) and a metal insert arranged in a marginal stepped area of the glass pane (10). The insert (32) is fixed to the glass pane (10) with polyurethane (30).

8 Claims, 1 Drawing Sheet

BULLETPROOF GLASS WINDOW WITH METAL INSERT

FIELD OF THE INVENTION

The invention relates to a bulletproof glass window with metal insert or metal element, whereby the bulletproof glass window can, for example, be used in motor vehicles for protecting the passengers of the motor vehicle against firing from outside.

BACKGROUND OF THE INVENTION

In the unexamined laid-open patent application DE 41 42 416 A1, a window made of bulletproof glass for use in a motor vehicle is described. The bulletproof window is graded at its faces or, respectively, marginal areas for reasons of adjustment of the bulletproof window to the frame of the motor vehicle. In the area of the grading, the bulletproof glass window is equipped with a bulletproof element, which is made from sheet metal, for example, as metal insert, with the help of which the penetration of a bullet that hits in the area of the graded faces at an angle, for example, into the interior of the motor vehicle is prevented.

In the manufacture of the known bulletproof glass window, the steel sheet is glued on the face surfaces of the bulletproof window. It has now turned out that this glued joint between steel sheet and glass does not meet the high quality requirements made regarding stability and permanency. This is in particular due to the different, thermal extensions of glass on the one hand and steel on the other hand. If one takes into consideration that, in automobile production, temperatures range from about −20° Celsius to +80° Celsius, high tensions act on the layer of glue or, respectively, the glued joint due to the thermal extension of glass and steel, which tensions the known glued layer does not resist permanently; it can rather happen that the steel sheet even separates from the glass surface.

SUMMARY OF THE INVENTION

The object of the present invention is to provide a bulletproof glass window with metal insert, in which the metal insert is permanently attached to the glass of the bulletproof glass window.

This object is met with the bulletproof glass window according to claim 1. Corresponding to the latter, the bulletproof glass window according to the invention, which can in particular be used in a motor vehicle, includes at least one glass pane or glass layer or several glass layers and a metal insert or metal member, whereby the metal insert is, in a marginal area of the bulletproof glass window, fixed to the glass pane or glass member(s) or glass surface with polyurethane.

The attachment according to the invention of the metal insert to a glass section or one glass pane or several of the bulletproof glass window surprisingly results in the desired permanent and reliable fixing of the metal insert to the glass, even if the bulletproof window is exposed to the high variations in temperature that occur in automobiles, for example. With the bulletproof glass window according to the invention, undesired separations of the metal insert from the glass as were observed with above state-of-the-art bulletproof glass windows do not occur any more due to the use of polyurethane as joining layer between the metal insert and the glass, wherein the inventive joining layer made of polyurethane provides the desired long-term stability and high quality of the connection between glass and metal. With this, the present invention has the fundamental advantage, however, that permanent protection of passengers of a motor vehicle, for example, is also guaranteed against firing that occurs right in the marginal area of the bulletproof glass window.

With polyurethane, generally a polyurethane system or polyurethane plastics are meant, i.e. a thermoplastic polyurethane, a polyurethane caoutchouc, a polyurethane elastomer etc., for example.

The metal insert can consist of several parts, for example if the bulletproof glass window has several gradings or steps at the edge, or it can be designed in one piece. For the metal insert, preferably steel or, respectively, a steel sheet is used. The shape of the metal insert or, respectively, steel insert can be the shape of a strip, angular shape etc.

The bulletproof glass window can, on its face or at the edge, have one or several gradings or steps or recesses depending on the application and in accordance with the design of the body frame of a motor vehicle, for example, in which the bulletproof glass window is placed as windscreen, rear window or as side window, for example. In this case, the metal insert is fixed with polyurethane in the area of the grading in order to prevent penetration of the bullet in the graded or stepped area of the bulletproof glass window that has smaller dimensions in this case.

The bulletproof glass window according to the invention is preferably sealed with polyurethane at its free faces and at the free surface of the metal insert in the area of the grading at least in part. This polyurethane sealing, too, is marked by high quality and long-term stability.

The bulletproof glass window according to the invention can be even or curved, i.e. have a curved cross section or curvature as often occurs in automobile production. Curved bulletproof glass windows also have, corresponding to the glass, one or several curved or bent steel inserts which are permanently fixed to the provided glass surfaces of the bulletproof glass window with polyurethane. In particular in the case of curved, bordering glass surfaces and steel insert surfaces, occurring distances between the surfaces that usually are too big can be leveled out or filled with polyurethane as fixing agent.

The metal insert or the steel sheet can be welded or bonded or injection moulded to a glass surface of the bulletproof glass window according to the invention by means of polyurethane. Further advantageous further developments of the invention can be seen from the dependent claims 2 to 8.

Other advantages, applications and advantageous further developments of the invention can be seen from the following description of one embodiment of the invention in connection with the drawings.

BRIEF DESCRIPTION OF THE DRAWINGS

FIG. 1 shows a schematic view from the side from which is fired of an examplified embodiment of the bulletproof glass window according to the present invention, which is designed as a lowerable or moveable side window in a motor vehicle, whereby the body of the motor vehicle is only hinted at.

DESCRIPTION OF THE PREFERRED EMBODIMENT

Figure 2:
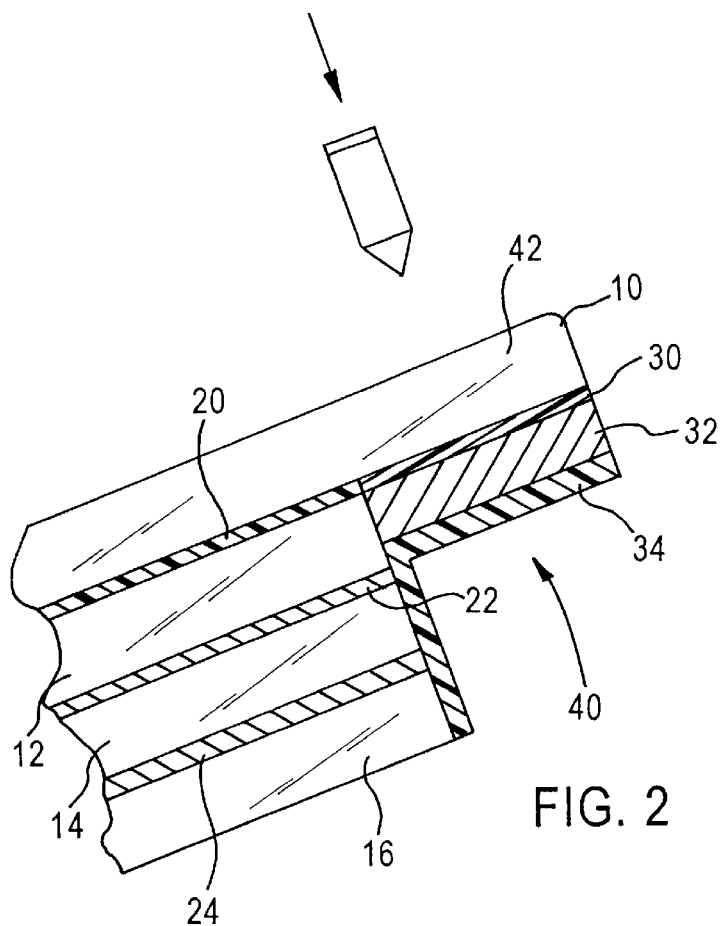
FIG. 2 shows a partial sectional view of the bulletproof glass window according to the invention of FIG. 1, seen along the intersection line A-A of FIG. 1, and magnified and turned as against FIG. 1, whereby FIG. 2 in particular illustrates the design of the bulletproof glass window at the edge.
Figure 1:
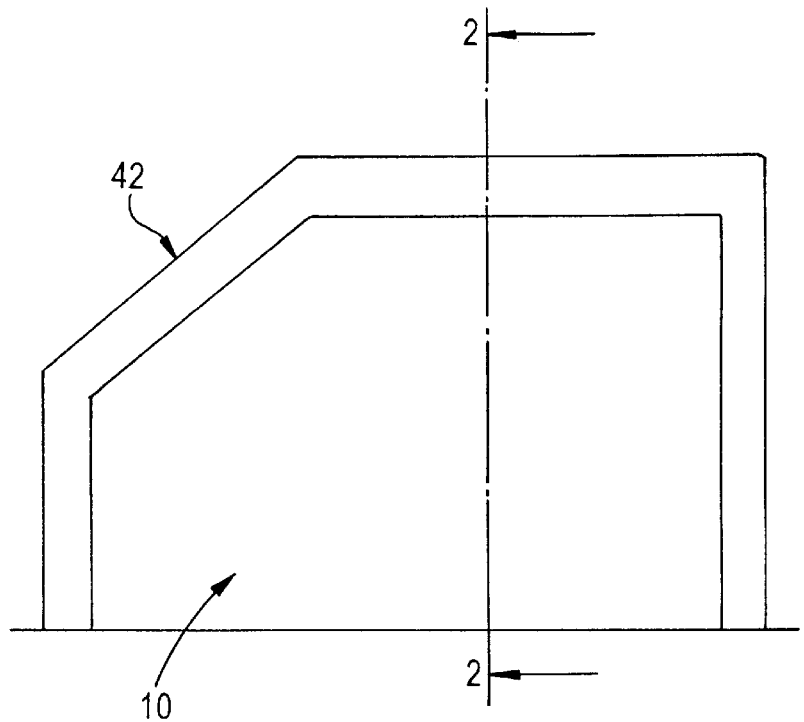

The embodiment of the bulletproof glass window according to the present invention shown in FIGS. 1 and 2 has several glass panes 10, 12, 14 and 16 or glass layers which are fixed to one another with their surfaces and in layers. The glass panes 10 and 12 are joined with each other by means of a polyvinyl butyral layer 20. The glass panes 12 and 14 and the glass panes 14 and 16 are joined with each other with the PVB layer 22 and, respectively, the PVB layer 24. The glass pane 10, however, which is arranged at the side from which is fired (comp. arrow and drawn bullet in FIG. 2) is longer than the other glass panes and juts out over the even faces of the other glass panes 12, 14 and 16 in a marginal area of the bulletproof glass window according to the invention shown. Due to this, the glass pane 10 forms a projection 42 or, respectively, a grading 40 or a stepped portion of the bulletproof glass window.

At the surface of the projection 42 of the glass pane 10 that is opposite of the surface of the side from which is fired, a steel sheet 32 with the shape of a strip that is rectangular in cross section is arranged as metal insert or steel insert, extending along the entire graded marginal area of the bulletproof glass window shown within the grading 40. The steel sheet 32 covers the bordering surface of the projection 42 completely and is, on its face, even with the glass pane 10. The steel sheet 32 is connected with or, respectively, fixed to the glass pane 10 by means of a polyurethane layer 30. The area between the steel sheet 32 and the faces of the glass panes 14 and 16 is sealed with another polyurethane layer 34.

The polyurethane layer 30 can, for example, be made of a thermoplastic polyurethane or can, for example, be produced in a conventional one-shot process or a prepolymer process in correspondingly designed plants by appropriately dosing and mixing known starting components. The still reactive polyurethane mixture is fed to or, respectively, injected into a mould or a form tool in which the bulletproof glass window, at least with its marginal area, and also the steel insert or the steel sheet 32, brought into line, have been inserted or clamped. The reactive polyurethane mixture injected between the steel sheet and the glass pane 10 reactively cures to form polyurethane 30 which reliably fixes the steel sheet 32 or the metal insert to the glass pane 10. The sealing polyurethane layer 34 can be produced with the above-mentioned processes as well.

What is claimed is:

1. Bulletproof glass window, comprising at least one glass pane having a stepped portion in a marginal edge thereof, and a metal insert fixed to said glass pane with polyurethane in said stepped portion.

2. Bulletproof glass window according to claim 1, wherein said metal insert is a steel sheet (32).

3. Bulletproof glass window according to claim 1, wherein the bulletproof glass window includes a plurality of glass panes (10, 12, 14, 16), which are successively connected with each other at their surfaces in layers.

4. Bulletproof glass window according to claim 3, wherein at least an outer one of said glass panes (10) on a side from which it is fired upon juts out over the other glass panes (12, 14, 16) with a projection (42) to form said stepped portion (40) of the bulletproof glass window, and wherein the metal insert (steel sheet 32) is fixed to an internal surface of the projection (42) formed in said stepped portion by means of said polyurethane (30).

5. Bulletproof glass window according to claim 4, wherein edges of the glass panes (12, 14, 16) terminating in the stepped portion and a free surface of the metal insert facing out of the stepped portion are sealed with polyurethane (34).

6. Bulletproof glass window according to claim 1, wherein the glass pane has a curved cross section.

7. Bulletproof glass window according to claim 1, wherein the metal insert is welded to the glass surface with said polyurethane (30).

8. A bulletproof glass window, comprising at least two glass panes (10, 12), one of said glass panes having an edge projecting outward from a corresponding edge of the other glass pane to define a step portion, and a metal insert arranged in said step portion and being fixed to a surface of the projecting edge with polyurethane.

* * * * *